United States Patent
Foufas et al.

(10) Patent No.: US 10,859,014 B2
(45) Date of Patent: Dec. 8, 2020

(54) METHOD AND APPARATUS FOR CONTROLLING AN ENGINE WITH EGR AND A TURBOCHARGER

(71) Applicant: VOLVO TRUCK CORPORATION, Gothenburg (SE)

(72) Inventors: Johannes Foufas, Gothenburg (SE); Dan Stenquist, Västra Frölunda (SE)

(73) Assignee: Volvo Truck Corporation, Gothenburg (SE)

(*) Notice: Subject to any disclaimer, the term of this patent is extended or adjusted under 35 U.S.C. 154(b) by 640 days.

(21) Appl. No.: 14/781,633

(22) PCT Filed: Apr. 5, 2013

(86) PCT No.: PCT/EP2013/001004
§ 371 (c)(1),
(2) Date: Oct. 1, 2015

(87) PCT Pub. No.: WO2014/161558
PCT Pub. Date: Oct. 9, 2014

(65) Prior Publication Data
US 2016/0061125 A1    Mar. 3, 2016

(51) Int. Cl.
F02D 41/00    (2006.01)
F02D 41/14    (2006.01)
(Continued)

(52) U.S. Cl.
CPC ..... F02D 41/0052 (2013.01); F02D 41/0007 (2013.01); F02D 41/1401 (2013.01);
(Continued)

(58) Field of Classification Search
CPC ............ F02D 41/0007; F02D 41/0052; F02D 41/0065; F02D 41/0077; F02D 2041/1409; F02D 2041/1431; F02D 2200/0414
See application file for complete search history.

(56) References Cited

U.S. PATENT DOCUMENTS 5,974,792 A    11/1999  Isobe
6,148,616 A *  11/2000  Yoshida ................ F02B 37/24
                                                        60/605.2
(Continued)

FOREIGN PATENT DOCUMENTS

CN    102817748 A    12/2012
DE    10349129 A1    5/2004
(Continued)

OTHER PUBLICATIONS

International Search Report (dated Oct. 21, 2013) for corresponding International App. PCT/EP2013/001004.
(Continued)

Primary Examiner — Erick R Solis
Assistant Examiner — Robert A Werner
(74) Attorney, Agent, or Firm — WRB-IP LLP

(57) ABSTRACT

A control system is provided for controlling an internal combustion engine. The internal combustion engine includes a turbocharging unit and an exhaust gas recirculation assembly. The control system is adapted to issue a boost pressure control signal. The control system includes a boost pressure controller adapted to determine the boost pressure control signal. The boost pressure controller has a first response time. The control system is adapted to issue an exhaust gas recirculation control signal for controlling an amount of recirculated exhaust gas via the exhaust gas recirculation assembly. The control system includes an exhaust gas recirculation controller adapted to determine the
(Continued)

exhaust gas recirculation control signal independently of the boost pressure control signal. The exhaust gas recirculation controller has a second response time, wherein the first response time differs from the second response time.

20 Claims, 5 Drawing Sheets

(51) Int. Cl.
F02D 23/02 (2006.01)
F02M 26/05 (2016.01)

(52) U.S. Cl.
CPC ...... F02D 23/02 (2013.01); F02D 2041/0075 (2013.01); F02D 2041/1409 (2013.01); F02D 2041/1431 (2013.01); F02D 2200/0414 (2013.01); F02M 26/05 (2016.02); Y02T 10/12 (2013.01); Y02T 10/40 (2013.01)

(56) References Cited

U.S. PATENT DOCUMENTS

| | | | |
|---|---|---|---|
| 6,701,244 B2* | 3/2004 | Oota | F01N 3/0842 123/350 |
| 8,479,511 B2* | 7/2013 | Pursifull | F02D 13/0207 123/432 |
| 9,212,629 B2* | 12/2015 | Hu | F02D 41/0007 |
| 2007/0068159 A1 | 3/2007 | Ueno et al. | |
| 2010/0024419 A1 | 2/2010 | Pierpont et al. | |
| 2012/0285420 A1 | 11/2012 | Iwatani | |
| 2014/0123966 A1* | 5/2014 | Ide | F02D 21/08 123/568.21 |

FOREIGN PATENT DOCUMENTS

| | | |
|---|---|---|
| EP | 1571321 | 9/2005 |
| EP | 1767760 A2 | 3/2007 |
| EP | 2532867 A2 | 12/2012 |
| JP | 2001073786 | 3/2001 |
| JP | 2005207234 | 8/2005 |
| JP | 2006016975 | 1/2006 |
| JP | 2008050946 A | 3/2008 |
| JP | 2009074382 | 4/2009 |
| JP | 2010007674 | 1/2010 |
| JP | 2013011173 | 1/2013 |
| WO | 20120100421 A1 | 8/2012 |

OTHER PUBLICATIONS

European Official Action (dated Jan. 18, 2017) for corresponding European App. 13 715 891.1.
Japanese Official Action (dated Feb. 27, 2017) for corresponding Japanese App. 2016-505709.
Chinese Official Action (Jul. 18, 2017) for corresponding Chinese Official Action (201380075423.3).
European Official Action (Aug. 16, 2019) for corresponding European App. 13/715891.1.

* cited by examiner

METHOD AND APPARATUS FOR CONTROLLING AN ENGINE WITH EGR AND A TURBOCHARGER

BACKGROUND AND SUMMARY

The present disclosure relates to a control system for controlling an internal combustion engine. Moreover, the present disclosure relates to a method for controlling an internal combustion engine.

An internal combustion engine of today is generally connected to an exhaust gas after treatment system. Purely by way of example, such an exhaust gas after treatment system may comprise at least one of the following components: an oxidation catalyst, a particle filter and a selective catalytic reduction arrangement. Moreover, an internal combustion engine may further comprise an exhaust gas recirculation arrangement in order to reduce nitrogen oxide emissions from the internal combustion engine.

Various components of the exhaust gas after treatment system may have to attain as temperature above a certain threshold temperature in order to function properly.

Generally, the exhaust gas after treatment system is heated by the exhaust gases from the internal combustion engine. However, in operating conditions in which the temperature ambient of the internal combustion engine is low there is a risk that the exhaust gases are not sufficiently heated in order to arrive at a preferred temperature of the exhaust gas after treatment system within a reasonable time.

In order to heat the exhaust gas after treatment system, U.S. Pat. No. 5,974,792 proposes controlling the fuel injection to an internal combustion engine to a rich side. However, such a control will increase the fuel consumption of the internal combustion engine.

It is desirable to provide an internal combustion engine control system that can control the internal combustion engine such that appropriate emission levels are obtained in a fuel efficient way even when the internal combustion engine is operated in cold environments.

As such, the present disclosure relates, according to an aspect thereof, to a control system for controlling an internal combustion engine. The internal combustion engine comprises a turbocharging unit and an exhaust gas recirculation assembly. The control system is adapted to issue a boost pressure control signal. The control system comprises a boost pressure controller adapted to determine the boost pressure control signal. The boost pressure controller has a first response time.

According to the present disclosure, the control system is adapted to issue an exhaust gas recirculation control signal for controlling an amount of recirculated exhaust gas via the exhaust gas recirculation assembly. The control system comprises an exhaust gas recirculation controller adapted to determine the exhaust gas recirculation control signal independently of the boost pressure control signal. Moreover, the exhaust gas recirculation controller has a second response time, wherein the first response time differs from the second response time.

A control system according to present disclosure implies that the boost pressure may be controlled on the basis of certain conditions, such as conditions of the environment ambient of the internal combustion engine. The above control of the boost pressure in turn implies that the mass flow through the internal combustion engine may be controlled. The mass flow through the internal combustion engine will in turn affect the temperature of the exhaust gas after treatment system. Consequently, by virtue of the control system according to the present disclosure, it is possible to at least indirectly control the temperature of the exhaust gas after treatment system without the need of providing excess fuel to the internal combustion engine and/or the exhaust gases.

Moreover, by virtue of the fact that the amount of recirculated exhaust gas via the exhaust gas recirculation assembly is controlled by an exhaust gas recirculation controller that has a response time that differs from the response time of the boost pressure controller, the flow through the exhaust gas recirculation assembly may be controlled with a low risk that the boost pressure controller and the exhaust gas recirculation controller may obtain an oscillating condition. As such, the above discussed difference in response times implies that the nitrogen oxide emissions from the internal combustion engine may be controlled in an appropriate manner at the same time as the mass flow through the internal combustion engine is controlled.

Optionally, the first response time is at least three times greater, alternatively at least five times greater or optionally at least ten times greater, than the second response time.

A difference in the response times above any one of the above discussed limits implies an appropriately low risk of obtaining oscillations in the system.

Optionally, the control system is adapted to receive a signal indicative of a condition of the environment ambient of the internal combustion engine and to issue the boost pressure control signal in response to the condition of the environment ambient of the internal combustion engine.

The issuance of a boost pressure control signal in response to the condition of the environment ambient of the internal combustion engine implies that the mass flow through the internal combustion engine may be controlled with due regard to ambient conditions, such as the ambient temperature and/or the ambient pressure. The above control in turn implies that the internal combustion engine may be controlled such that a desired temperature of the exhaust gas after treatment system may be arrived at within a reasonable time.

Optionally, the control system is configured such that when the control system receives a signal indicative of a predetermined first condition of the environment ambient, the control system issues a control signal indicative of a first boost pressure and when the control system receives a signal indicative of a predetermined second condition of the environment ambient, which second ambient condition differs from the first ambient condition, the control system issues a control signal indicative of a second boost pressure, the second boost pressure differs from the first boost pressure.

Optionally, the condition of the environment ambient of the internal combustion engine comprises the ambient temperature.

Optionally, the control system is configured such that when the control system receives a signal indicative of a predetermined first ambient temperature, the control system issues a control signal indicative of a first boost pressure and when the control system receives a signal indicative of a predetermined second ambient temperature, which second ambient temperature is lower than the first ambient temperature, the control system issues a control signal indicative of a second boost pressure. The second boost pressure is lower than the first boost pressure.

Controlling the boost pressure as a friction of the temperature as has been described hereinabove implies that an improved efficiency may be obtained for the internal combustion engine, in particular when the internal combustion engine is operated in a cold climate. The improved efficiency emanates from the capability of modifying the mass flow through the internal combustion engine in response to the ambient temperature.

Optionally, the control system is also adapted to receive a signal indicative of an engine operation point of the internal combustion engine. The control system is adapted to issue the boost pressure control signal in response the condition of the environment ambient of the internal combustion engine and the engine operation point.

Optionally, the control system comprises a map look up function comprising a plurality of desired boost pressures for different predetermined conditions of the ambient environment.

Optionally, the control system comprises map look, up function comprising a plurality of desired amounts of recirculated exhaust gas via the exhaust gas recirculation assembly for different predetermined conditions of the ambient environment.

Optionally, the internal combustion engine comprises a boost pressure regulator and the control system is adapted to issue the boost pressure control signal to the boost pressure regulator.

Optionally, the boost pressure regulator comprises a variable geometry turbine and the control system is adapted to issue the boost pressure control signal comprising information indicative of a desired geometry of the variable geometry turbine.

Controlling the boost pressure when the boost pressure regulator comprises a variable geometry turbine implies that the pumping resistance of the turbine may be reduced for certain operating conditions. Such a pump resistance reduction may in turn result in a reduction of the fuel consumption. The above reduction of the pumping resistance may be advantageous when the geometry of the variable geometry turbine is controlled in response to the temperature ambient of the internal combustion engine.

Optionally, the boost pressure regulator comprises an inlet throttle valve and the control system is adapted to issue the boost pressure control signal comprising information indicative of a desired position of the inlet throttle valve.

Optionally, the boost pressure controller comprises a boost pressure PID controller.

Optionally, the exhaust gas recirculation controller comprises an exhaust gas recirculation PID controller.

Optionally, the control system is adapted to issue an exhaust gas recirculation control signal to at least an exhaust gas recirculation regulator.

Optionally, the exhaust gas recirculation regulator comprises an exhaust gas recirculation valve.

A second aspect of the present disclosure relates to an internal combustion engine comprising a control system according to the first aspect of the present disclosure.

A third aspect of the present disclosure relates to a vehicle comprising a control system according to the first aspect of the present disclosure or an internal combustion engine according to the second aspect of the present disclosure.

A fourth aspect of the present disclosure relates to a method for controlling an internal combustion engine comprising a turbocharging unit and an exhaust gas recirculation assembly. The method comprises:

issuing a boost pressure control signal using a boost pressure controller having a first response time, and issuing an exhaust gas recirculation control signal using an exhaust gas recirculation controller having a second response time, wherein the first response time differs from the second response time.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

Figure 1:
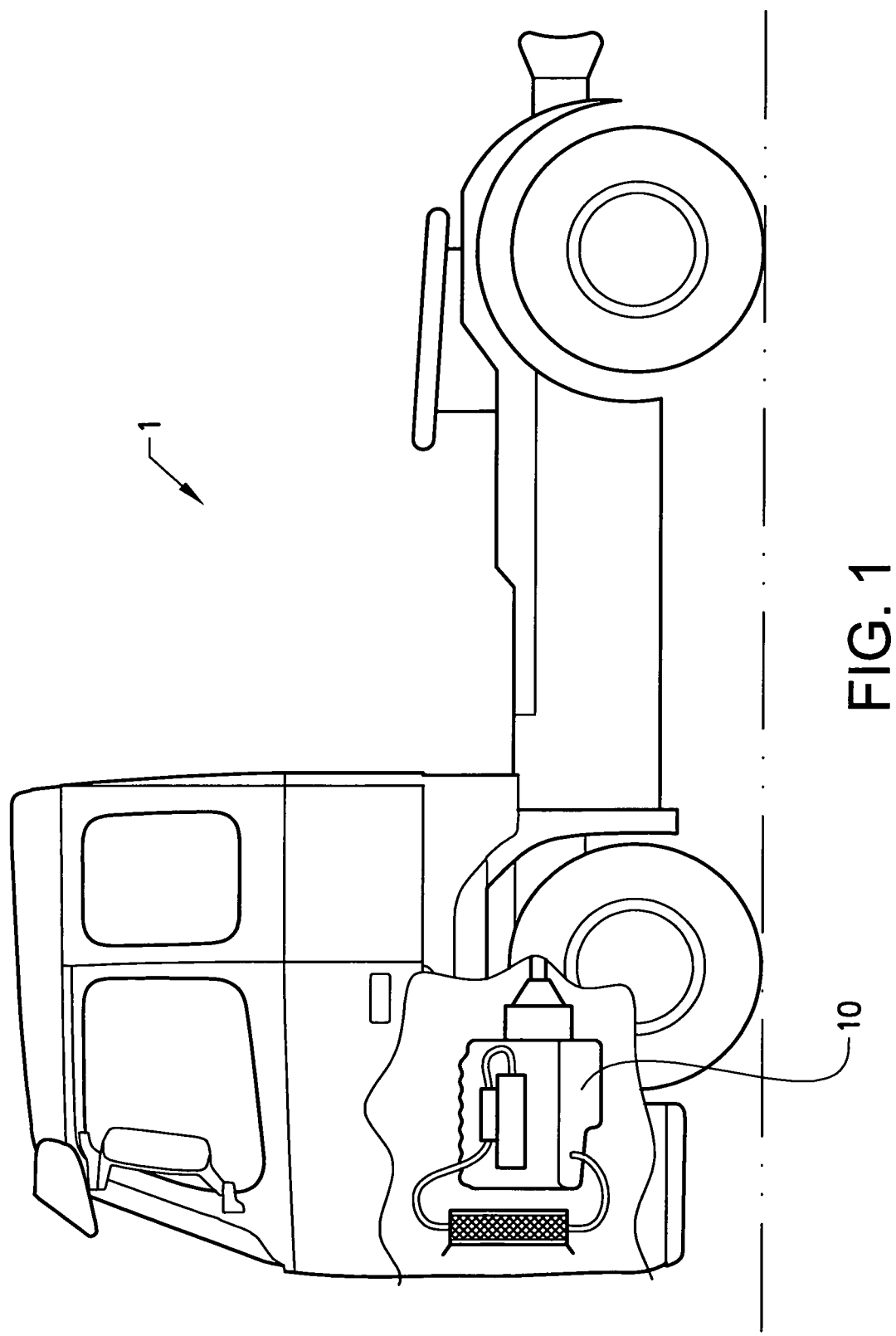
FIG. 1 illustrates a truck comprising an internal combustion engine.

The invention will below be described for a vehicle in the form of a truck 1 such as the one illustrated in FIG. 1. The truck 1 should be seen as an example of a vehicle which could comprise a control system according to the present invention. However, the control system of the present invention may be implemented in a plurality of different types of objects, e.g. other types of vehicles. Purely by way of example, the control system could be implemented in a truck, a tractor, a car, a bus, a work machine such as a wheel loader or an articulated hauler or any other type of construction equipment. The truck 1 comprises an internal combustion engine 10.

Figure 2:
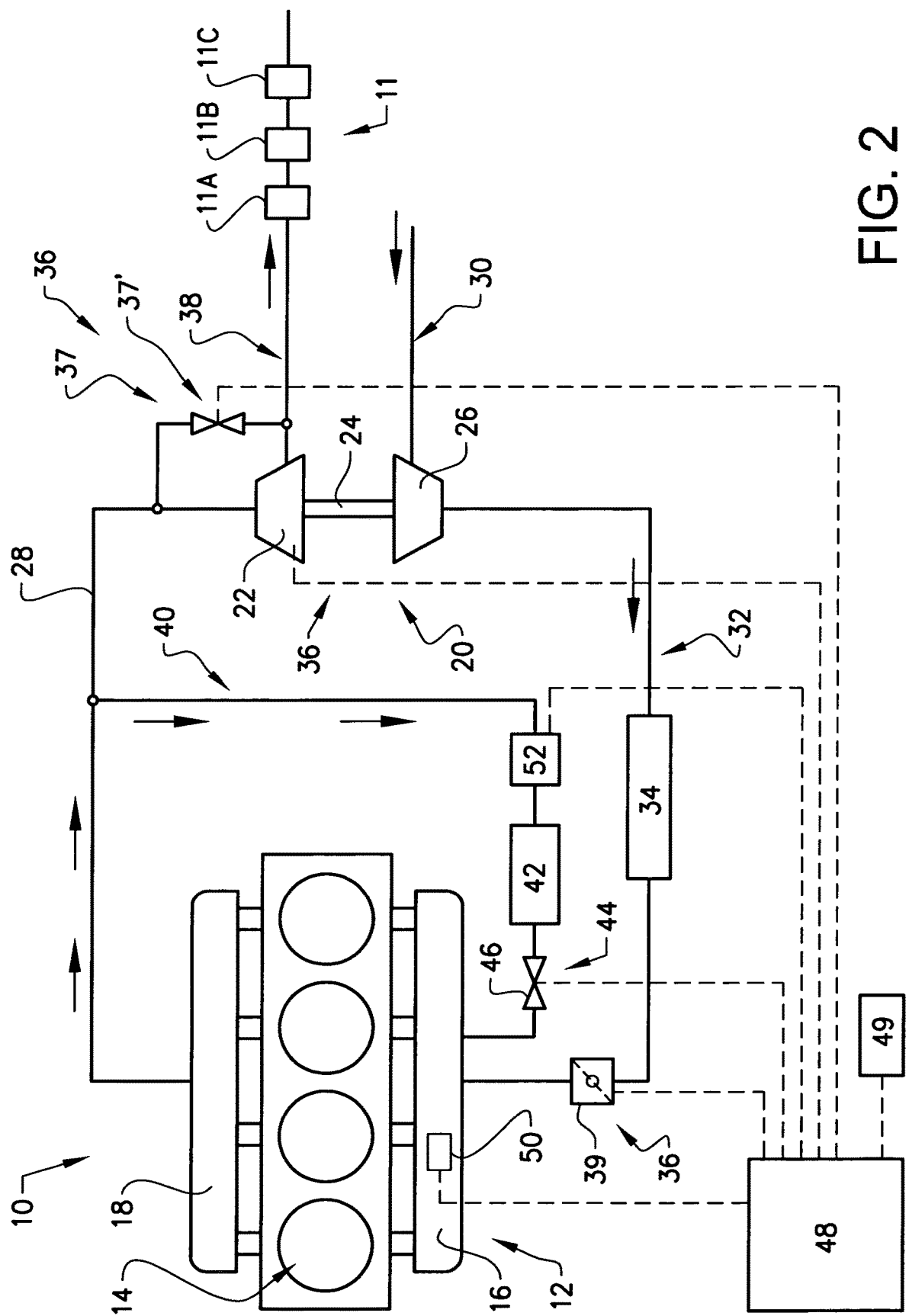
FIG. 2 schematically illustrates an internal combustion engine that comprises a control system according to the present disclosure.

FIG. 2 schematically illustrates the internal combustion engine 10. The internal combustion engine 10 comprises an engine block 12 which in turn may comprise a plurality of piston cylinders 14 with an inlet manifold 16 and an exhaust manifold 18.

Moreover, the FIG. 2 internal combustion engine 10 comprises a turbocharging unit 20. The turbocharging unit comprises a turbine 22 which is operatively connected, for instance via a turbine shaft 24 to a compressor 26. Exhaust gases are led from the exhaust manifold 18 to the turbine 22 via an exhaust conduit 28. Moreover, the compressor 26 may be in fluid communication with an intake line 30 and the inlet manifold 16 such that compressed air may be supplied from the intake line 30 to the inlet manifold 16 via an inlet conduit assembly 32. Purely by way of example, the inlet conduit assembly 32 may comprise an intercooler 34.

The embodiment of the internal combustion engine 10 illustrated in FIG. 2 comprises a boost pressure regulator 36 adapted to regulate the boost pressure at the inlet manifold 16. As a non-limiting example, the turbocharging unit 20 may form a part of the boost pressure regulator 36.

Instead of, or in addition to the above discussed turbocharging unit 20, the boost pressure regulator 36 may comprise a wastegate assembly 37. The wastegate assembly 37 is adapted to divert at least a portion of the exhaust gases from the turbine 22. Purely by way of example, the wastegate assembly 37 may comprise a wastegate valve 37'.

Instead of, or in addition to the turbocharging unit 20 and/or the wastegate assembly 37, the boost pressure regulator 36 may comprise an intake throttle valve 39 that forms part of the inlet conduit assembly 32.

Exhaust gases that have passed through the turbocharger unit 20 are led into the atmosphere via an exhaust line 38. Furthermore, the FIG. 2 internal combustion engine 10 comprises an exhaust gas recirculation assembly 40 such that at least a portion of the exhaust gases may be returned to the inlet manifold 16 via the exhaust gas recirculation assembly 40. Purely by way of example, the exhaust gas recirculation assembly 40 may comprise an exhaust gas recirculation cooler 42. Moreover, as another non-limiting example, the exhaust gas recirculation assembly 40 may comprise an exhaust gas recirculation regulator 44 which in FIG. 2 is exemplified as a regulator 44 that comprises an exhaust gas recirculation valve 46.

As may be gleaned from FIG. 2, the embodiment of the internal combustion engine 10 illustrated therein further comprises a control system 48 for controlling the internal combustion engine 10. The control system 48 may be adapted to communicate with at least the boost pressure regulator 36 and possibly also with the exhaust gas recirculation regulator 44. Purely by way of example, the above discussed communication may be achieved by means of electrical cables (indicated by dotted lines in FIG. 2) and/or by wireless communication. It should be noted that the possible communications indicated in FIG. 2 should be regarded as a non-limiting example only. In other embodiments of the internal combustion engine 10, the control system 48 may be adapted to communicate with more or fewer components of the engine 10.

The FIG. 2 embodiment of the internal combustion engine 10 comprises a sensor 50 for sensing the boost pressure and/or the boost temperature. Purely by way of example, and as is indicated in the FIG. 2 embodiment, such a sensor may be located in the inlet manifold 16. The boost pressure sensor 50 may be adapted to communicate with the control system 48, for instance via an electrical cable and/or by wireless communication. As a non-limiting example, the boost pressure sensor 50 may be adapted to provide a measured output signal, indicative of the boost pressure and/or the boost temperature, to a feedback controller of the control system 48.

Furthermore, the embodiment of the internal combustion engine 10 illustrated in FIG. 2 comprises a flow sensor 52 adapted to determine the flow through the exhaust gas recirculation assembly 40. As a non-limiting example, the flow sensor 52 may comprise a venturi tube. The flow sensor 52 may be adapted to communicate with the control system 48, for instance via an electrical cable and/or by wireless communication. As a non-limiting example, the flow sensor 52 may be adapted to provide a measured output signal, indicative of e.g. a flow rate through the exhaust gas recirculation assembly 40, to a feedback controller of the control system 48.

Moreover, the FIG. 2 embodiment of the internal combustion engine comprises an ambient environment sensor 49. The ambient environment sensor 49 may be adapted to detect a condition of the environment ambient of the internal combustion engine 10. Moreover, the ambient environment sensor 49 may be adapted to issue a signal indicative of the condition thus detected to the control system 48. Purely by way of example, the ambient environment sensor 49 may be adapted to detect at least one of the following ambient conditions: temperature, pressure and humidity.

FIG. 2 further illustrates that the internal combustion engine 10 may be connected to an exhaust gas after treatment system 11. Purely by way of example, the exhaust gas after treatment system 11 may comprise at least one of the following components: an oxidation catalyst 11A, a particle tiller 11 B and a selective catalytic reduction arrangement 11C. The internal combustion engine 10 and the exhaust gas after treatment system 11 may form an internal combustion engine system.

Figure 3:
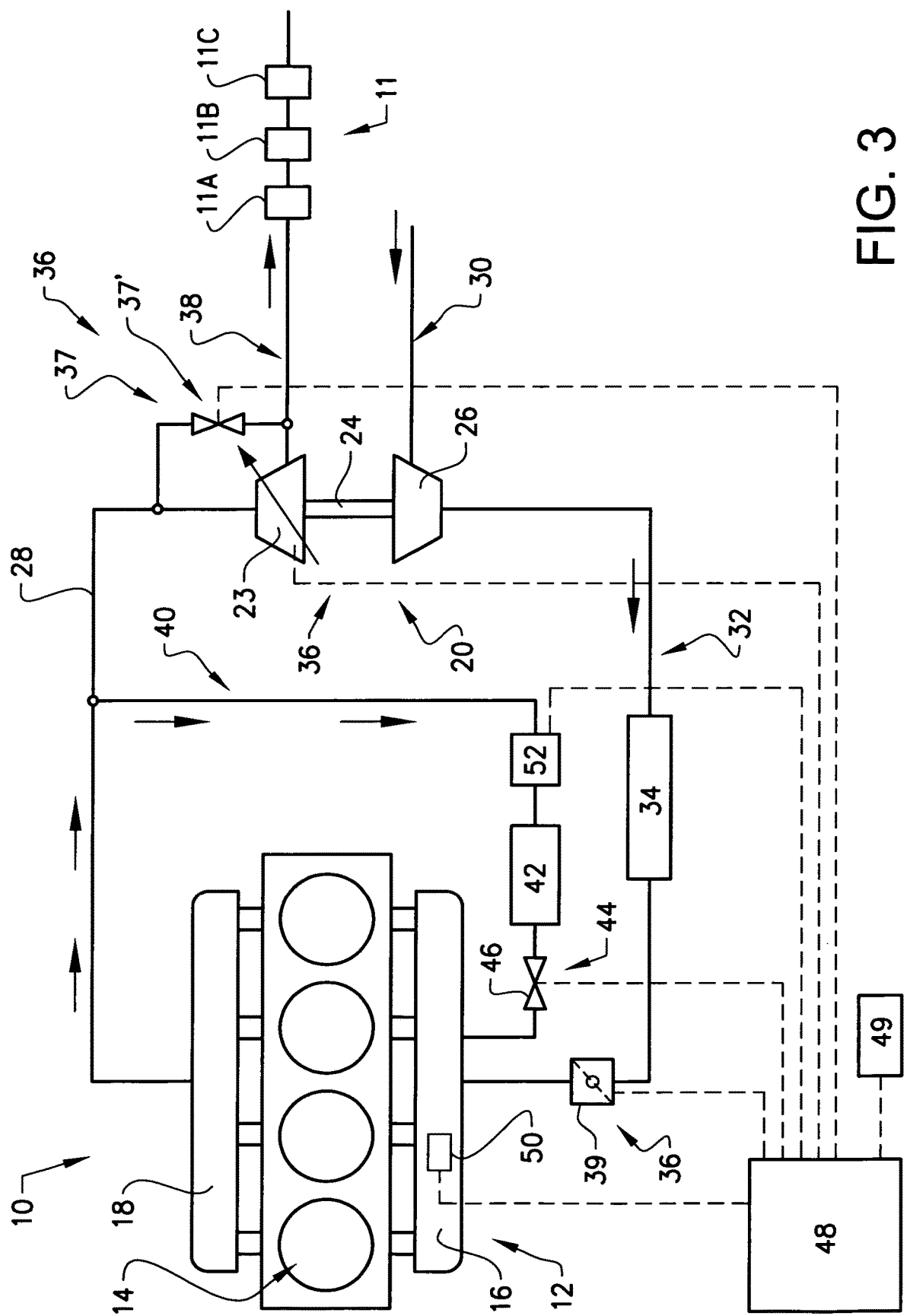
FIG. 3 schematically illustrates another internal combustion engine that comprises a control system according to the present disclosure.

FIG. 3 illustrates another embodiment of the internal combustion engine 10. The FIG. 3 internal combustion engine 10 is similar to the FIG. 2 internal combustion engine 10.

However, in contrast to the FIG. 2 engine 10, the turbocharging unit 20 of the FIG. 3 engine 10 comprises a variable geometry turbine 23. Purely by way of example, a variable geometry turbine 23 may comprise one or more pivotable guide vanes (not shown) and/or one or more slidable walk (not shown) which may be used for altering the effective aspect ratio of the turbocharging unit 20.

As such, in the FIG. 3 implementation of the internal combustion engine 10, the boost pressure regulator 36 may comprise the variable geometry turbine 23 such that the boost pressure may be regulated by regulating the geometry, for instance the position of the guide vane(s) and/or the slidable wall(s), of the variable geometry turbine 23.

Figure 4:
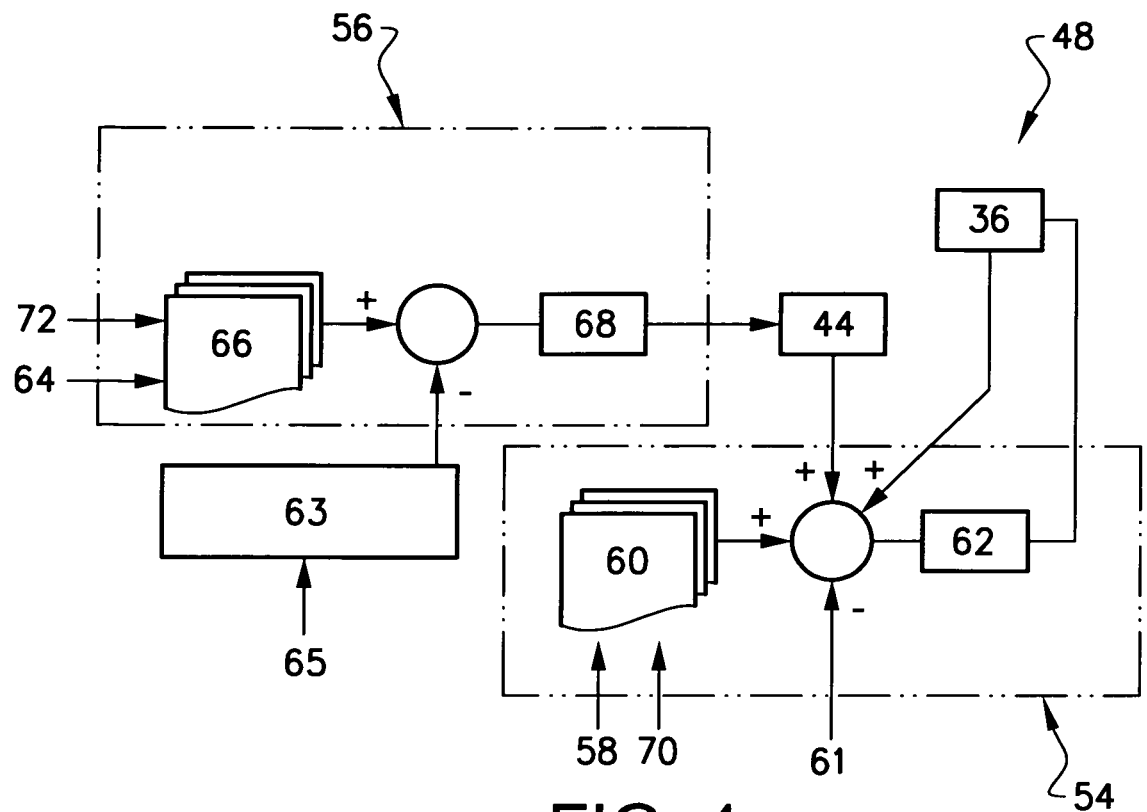
FIG. 4 schematically illustrates an embodiment of a control system.

FIG. 4 illustrates an embodiment of the control system 48. The FIG. 4 embodiment of the control system 48 is adapted to issue a boost pressure control signal to the boost pressure regulator 36. The control system comprises a boost pressure control system 54 adapted to determine the boost pressure control signal.

Moreover, the FIG. 4 control system 48 is also adapted to issue an exhaust gas recirculation control signal for controlling an amount of recirculated exhaust gas via the exhaust gas recirculation assembly not shown in FIG. 4). The FIG. 4 embodiment of the control system 48 is adapted to issue the exhaust gas recirculation control signal to the exhaust gas recirculation regulator 44. However, other embodiments of the control system 4$ may be adapted to issue the exhaust gas recirculation control signal to other components of an internal combustion engine (not shown in FIG. 4) in order to directly or indirectly control the amount of recirculated exhaust gas via the exhaust gas recirculation assembly.

Moreover, the control system 48 comprises an exhaust gas recirculation control system 56 adapted to determine the exhaust gas recirculation control signal independently of the boost pressure control signal.

Preferably, the control system 48 is adapted to receive a signal 58 indicative of a condition of the environment ambient of the internal combustion engine and to issue the boost pressure control signal in response to the condition of the environment ambient of the internal combustion engine. Purely by way of example, such a signal 58 may be issued from the ambient environment sensor 49 illustrated in FIG. 2 or FIG. 3.

Purely by way of example, the above discussed ambient environment control signal 58 may be sent to a boost pressure feedforward control 60 of the boost pressure control system 54. Purely by way of example, the boost pressure feedforward control 60 may comprise a look up function. Moreover, the boost pressure control system 54 may comprise a boost pressure controller 62. The boost pressure controller 62 may be a feedback controller. Purely by way of example, the boost pressure controller 62 may comprise a PID controller, i.e. a Proportional Integral Derivative controller. Alternatively, the boost pressure controller 62 may comprise a P (Proportional) controller or a PI (Proportional Integral) controller.

The boost pressure controller 62 has a first response time T Purely by way of example, the first response time Ti may be equal to or above 1 s, alternatively equal to or above 2 s.

As used herein, the expression "response time" relates to the time elapsed from the application of an instantaneous step input to the time at which the controller output has reached and remained within an error band of 5% of the magnitude of the instantaneous step.

In a similar vein, the exhaust gas recirculation control system 56 may also be adapted to receive a second signal 64 indicative of a condition of the environment ambient of the internal combustion engine and to issue the exhaust gas recirculation in response to the condition of the environment ambient of the internal combustion engine.

Purely by way of example, the above discussed second ambient environment control signal 64 may be the same as the first ambient environment control signal 58. Moreover, as a non-limiting example, the second ambient environment control signal 64 may be sent to an exhaust gas recirculation feedforward control 66 of the exhaust gas recirculation control system 56. Purely by way of example, the exhaust gas recirculation feedforward control 66 may comprise a look up function. Moreover, the exhaust gas recirculation control system 56 may comprise an exhaust gas recirculation controller 68. The exhaust gas recirculation controller 68 may comprise a feedback controller. Purely by way of example, the exhaust gas recirculation controller 68 may comprise a PID controller.

Alternatively, the exhaust gas recirculation controller 68 may comprise a P controller or a PI controller.

The exhaust gas recirculation controller 68 has a second response time $T_2$. The first response time Ji differs from the second response time $T_2$. Purely by way of example, the second response time $T_2$ may be equal to or below 0.2 s, alternatively equal to or below 0.1 s.

Purely by way of example, the first response time $T_1$ is at least three times greater than the second response time $T_2$. Other non-limiting examples are that the first response time is at least five times, preferably at least ten times, greater than the second response time $T_2$.

At least one, though preferably both, the first and second ambient environment control signals 58, 64 may comprise information as regard the ambient temperature and/or the ambient pressure.

In a similar vein, at least one, though preferably both, of the boost pressure control system 54 and the exhaust gas recirculation control system 56 may be adapted to receive an engine control signal 70, 72 indicative of the operation of the internal combustion engine. Purely by way of example, the engine control signal 70, 72 may comprise information indicative of the engine speed and/or the engine torque. Moreover, the engine control signal 70, 72 may comprise information indicative of level of emissions produced by the internal combustion engine.

As has been intimated hereinabove when presenting the embodiment of the internal combustion engine that is illustrated in FIG. 2 or FIG. 3, the boost pressure regulator 36 may comprise at least one of the following components: a variable geometry turbine, a wastegate assembly and an intake throttle valve. As such, the boost pressure control system 54 may be adapted to transmit the boost pressure control signal to the component or components that form part of the boost pressure regulator 36.

In the non-limiting, example when the boost pressure regulator 36 comprises a variable geometry turbine 23, such as in the FIG. 3 embodiment of the internal combustion engine 10, the control system 48, using the boost pressure control system 54, is adapted to issue boost pressure control signal that comprises information indicative of a desired geometry of the variable geometry turbine.

In the event that the boost pressure regulator comprises an inlet throttle valve, the control system 48 is adapted to, instead of, or in addition to, issuing a boost pressure control signal that is indicative of a desired geometry of the variable geometry turbine, issue a boost pressure control signal comprising information indicative of a desired position of the inlet throttle valve.

Moreover, in the FIG. 4 embodiment of the control system 48, the exhaust gas recirculation control system 56 is adapted to issue a signal to the exhaust gas recirculation regulator 44, e.g. to an exhaust gas recirculation valve 46.

FIG. 4 further illustrates that the boost pressure control system 54 is adapted to receive a measured boost pressure signal 61. Purely by way of example, the measured boost pressure signal 61 may be determined using the boost pressure sensor 50 in FIG. 2.

Moreover, and as may be gleaned from FIG. 4, the boost pressure controller 62 may use signals from the boost pressure feedforward control 60, the exhaust gas recirculation regulator 44 and the boost pressure regulator 36 as control signals that are compared to the measured boost pressure signal 61.

In a similar vein, the exhaust gas recirculation control system 56 may be associated with an exhaust gas recirculation level model 63 that is adapted to issue an exhaust gas recirculation level signal to the exhaust gas recirculation control system 56. To this end, the exhaust gas recirculation level model 63 is adapted to receive a one or more signals 65 that can be used for determining the present exhaust was recirculation level. Purely by way of example, the signal 65 may be issued from the flow sensor 52 illustrated in FIG. 2 or FIG. 3.

The exhaust gas recirculation level model 63 may be a theoretical model that may use one or more map look up functions and/or one or more discrete or continuous functions. Purely by way of example, the one or more signals may comprise one or more of the following: a measured boost pressure, a measured boost temperature, a measured exhaust gas recirculation flow, a measured exhaust gas recirculation temperature and an amount of injected fuel.

Figure 5:
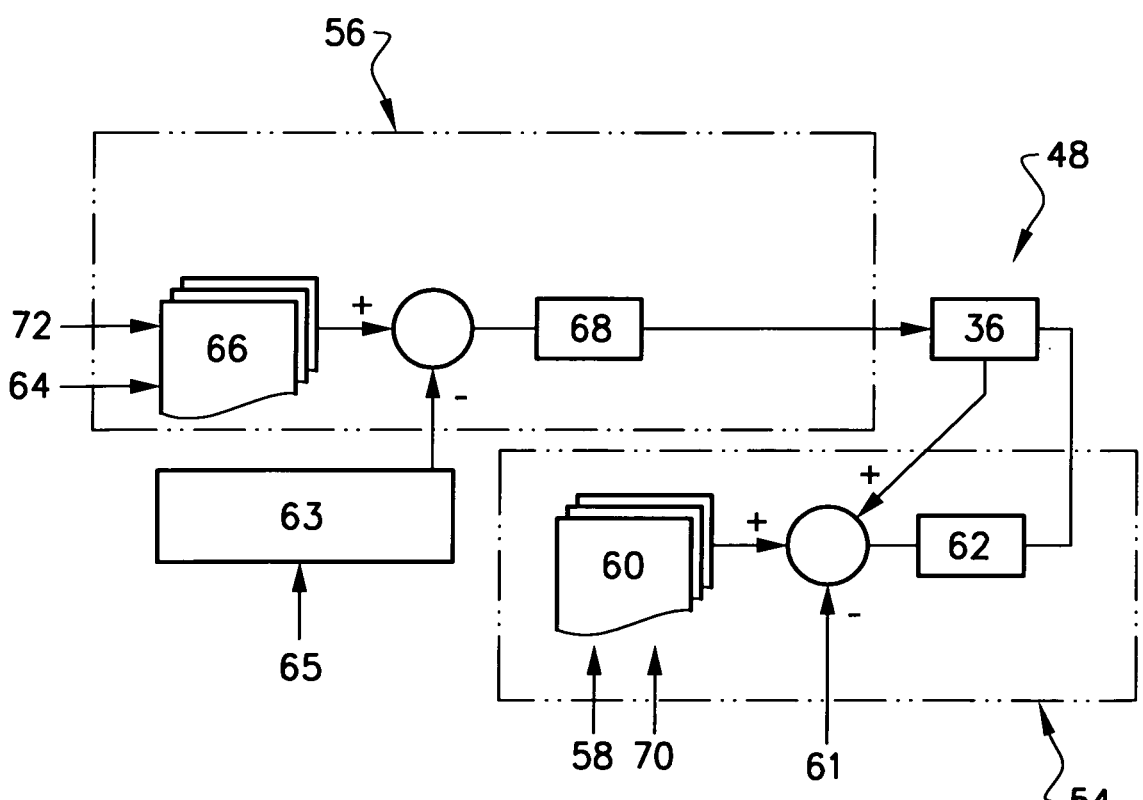
FIG. 5 schematically illustrates another embodiment of a control system, and FIG. 6 schematically illustrates a further embodiment of a control system.

FIG. 5 illustrates another embodiment of the control system 48 which embodiment is similar to the FIG. 4 embodiment. However, as compared to the FIG. 4 embodiment, the exhaust gas recirculation control system 56 is in FIG. 5 adapted to issue a signal to the boost pressure regulator 36. As such, the FIG. 5 embodiment of the control system 48 uses the fact that a change of the boost pressure regulator 36 may have an influence on the amount of exhaust gas that is recirculated via the exhaust gas recirculation assembly.

As such, in the embodiment illustrated in FIG. 5, both the boost pressure control system 54 and the exhaust gas recirculation control system 56 issue control signals to the boost pressure regulator 36.

Figure 6:
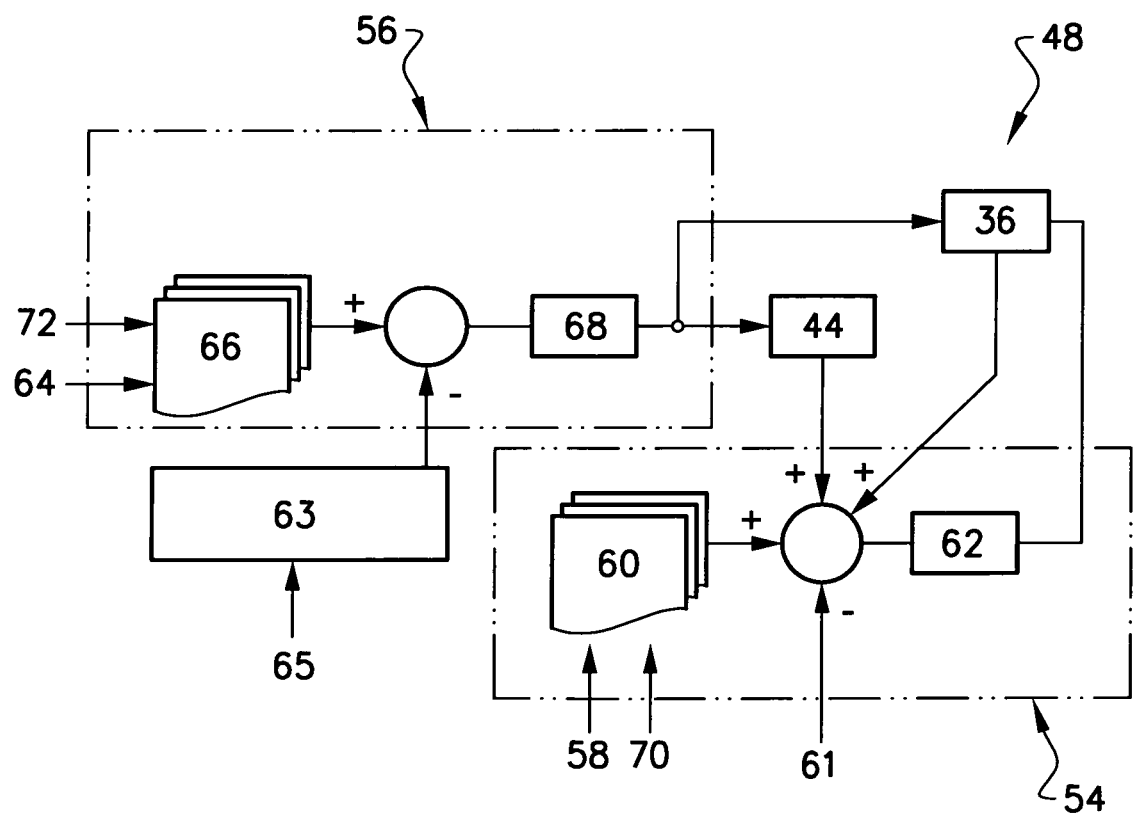

FIG. 6 illustrates a further embodiment of the control system 48 in which the exhaust gas recirculation control system 56 is adapted to issue a first signal to the exhaust gas recirculation regulator 44 and a second signal to the boost pressure regulator 36. Purely by way of example, in an embodiment of the control system 48 such as the one illustrated in FIG. 6, the signal issued from the exhaust gas recirculation control system 56 to the boost pressure regulator 36 may be inversely proportional to the signal that is issued from the exhaust gas recirculation control system 56 to the exhaust gas recirculation regulator 44. As such, if the signal issued to the exhaust gas recirculation regulator 44 is indicative of an increased exhaust gas recirculation flow, the signal to the boost pressure regulator 36 may be indicative of a decreased boost pressure. Thus, in the non-limiting example wherein the internal combustion engine comprises a variable geometry turbine 23 and an exhaust gas recirculation valve 46, if the exhaust gas recirculation control system 56 issues a signal to further open the an exhaust gas recirculation valve 46, the exhaust gas recirculation control system 56 may also issue a signal to close the variable geometry turbine 23.

Finally, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control system for controlling an internal combustion engine, the internal combustion engine comprising a turbocharging unit and an exhaust gas recirculation assembly, the control system being configured to issue a boost pressure control signal, the control system comprising a boost pressure controller configured to determine the boost pressure control signal, the boost pressure controller having a first response time, wherein the control system is configured to issue an exhaust gas recirculation control signal for controlling an amount of recirculated exhaust gas via the exhaust gas recirculation assembly, the control system comprising an exhaust gas recirculation controller configured to determine the exhaust gas recirculation control signal independently of the boost pressure control signal, the exhaust gas recirculation controller having a second response time, wherein the first response time differs from the second response time.

2. The control system according to claim 1, wherein the first response time is at least three times greater than the second response time.

3. The control system according to claim 1, wherein the first response time is at least five times greater than the second response time.

4. The control system according to claim 1, wherein the control system is configured to receive a signal indicative of a condition of the environment ambient of the internal combustion engine and to issue the boost pressure control signal in response to the condition of the environment ambient of the internal combustion engine.

5. The control system according to claim 4, wherein the control system is configured such that when the control system receives a signal indicative of a predetermined first condition of the environment ambient, the control system issues a control signal indicative of a first boost pressure and when the control system receives a signal indicative of a predetermined second condition of the environment ambient, which second ambient condition differs from the first ambient condition, the control system issues a control signal indicative of a second boost pressure, the second boost pressure differs from the first boost pressure.

6. The control system according to claim 4, wherein the condition of the environment ambient of the internal combustion engine comprises the ambient temperature.

7. The control system according to claim 6, wherein the control system is configured such that when the control system receives a signal indicative of a predetermined first ambient temperature, the control system issues a control signal indicative of a first boost pressure and when the control system receives a signal indicative of a predetermined second ambient temperature, which second ambient temperature is lower than the first ambient temperature, the control system issues a control signal indicative of a second boost pressure, the second boost pressure being lower than the first boost pressure.

8. The control system according to claim 4, wherein the control system is also configured to receive a signal indicative of an engine operation point of the internal combustion engine, the control system being configured to issue the boost pressure control signal in response the condition of the environment ambient of the internal combustion engine and the engine operation point.

9. The control system according to claim 4, wherein the control system comprises a map look up function comprising a plurality of desired boost pressures for different predetermined conditions of the ambient environment.

10. The control system according to claim 4, wherein the control system comprises a map look up function comprising a plurality of desired amounts of recirculated exhaust gas via the exhaust gas recirculation assembly for different predetermined conditions of the ambient environment.

11. The control system according to claim 1, wherein the internal combustion engine comprises a boost pressure regulator, the control system being configured to issue the boost pressure control signal to the boost pressure regulator.

12. The control system according to claim 11, wherein the boost pressure regulator comprises a variable geometry turbine and the control system is configured to issue the boost pressure control signal comprising information indicative of a desired geometry of the variable geometry turbine.

13. The control system according to claim 11, wherein the boost pressure regulator comprises an inlet throttle valve and the control system is configured to issue the boost pressure control signal comprising information indicative of a desired position of the inlet throttle valve.

14. The control system according to claim 1, wherein the boost pressure controller comprises a boost pressure PID controller.

15. The control system according to claim 1, wherein the exhaust gas recirculation controller comprises an exhaust gas recirculation PID controller.

16. The control system according to claim 1, wherein the control system is configured to issue the exhaust gas recirculation control signal to at least an exhaust gas recirculation regulator.

17. The control system according to claim 16, wherein the exhaust gas recirculation regulator comprises an exhaust gas recirculation valve.

18. An internal combustion engine comprising a control system according to claim 1.

19. A vehicle, comprising a control system according to claim 1.

20. A method for controlling an internal combustion engine comprising a turbocharging unit and an exhaust gas recirculation assembly, the method comprising:
  issuing a boost pressure control signal using a boost pressure controller having a first response time, and
  issuing an exhaust gas recirculation control signal using an exhaust gas recirculation controller having a second response time, wherein the first response time differs from the second response time.

\* \* \* \* \*